United States Patent [19]

Scalzo et al.

[11] 3,853,425
[45] Dec. 10, 1974

[54] TURBINE ROTOR BLADE COOLING AND SEALING SYSTEM

[75] Inventors: Augustine J. Scalzo, Philadelphia; Leroy McLaurin, Springfield, both of Pa.

[73] Assignee: Westinghouse Electric Corporation, Pittsburgh, Pa.

[22] Filed: Sept. 7, 1973

[21] Appl. No.: 395,316

[52] U.S. Cl.................... 416/95, 416/96, 416/220
[51] Int. Cl................................................ F01d 5/18
[58] Field of Search ............... 416/95, 193, 220, 96

[56] References Cited
UNITED STATES PATENTS

| 3,490,852 | 1/1970 | Carlstrom et al. | 416/95 |
| 3,644,058 | 2/1972 | Barnabei et al. | 416/95 |
| 3,728,042 | 4/1973 | Hugoson et al. | 416/95 |
| 3,748,060 | 7/1973 | Hugoson et al. | 416/220 X |

Primary Examiner—Everette A. Powell, Jr.
Attorney, Agent, or Firm—D. N. Halgren

[57] ABSTRACT

An assembly for sealing the root portions of gas turbine rotor blades of the side entry type into a rotor. The assembly also provides cooling for the blades. A radially directed three-sided channel disposed on the upstream side of the rotor near its periphery forces cooling fluid radially outward to a chamber beneath each blade root. The rotor, when rotating, causes the channel to act as a pump due to centrifugal force imparted to the cooling fluid. The coolant fluid is forced out the channel and into the chamber, then the coolant fluid is discharged radially through the blade root. A chamber sealing plate prevents axial leakage of the coolant past the downstream side of the blade root. The chamber sealing plate is fitted into a groove on the periphery of the rotor radially inwardly of and near the downstream end of the blade root. The sealing plate is notched, and interlocks with a corresponding tab in the downstream base of the blade root, which prevents the seal plates from moving circumferentially during turbine operation. The seal plate is further restrained axially by contact with an exhaust sealing and locking plate that is mounted in another peripheral groove downstream of the chamber sealing plate. The exhaust plate seals the downstream side of the blade entry channels, and locks the blades into the rotor.

5 Claims, 7 Drawing Figures

TURBINE ROTOR BLADE COOLING AND SEALING SYSTEM

BACKGROUND OF THE INVENTION

1. Field of the Invention

The present invention relates generally to turbine rotors and more particularly to a combined structure for sealing and locking rotor blades into a rotor, and for cooling the blades.

2. Description of the Prior Art

It is known that higher initial operating temperatures in a gas turbine, will provide high thermal efficiency and power output. However, operating temperatures of the gas turbines are limited to the maximum temperatures tolerable in the rotating blades. High tension and sheer stresses in the blades are other limiting factors in turbine operation. The higher the temperatures, usually the less stress allowable in the blades.

Cooling the blades, or forming the blades from temperature resistant material, or both, are often necessary to reach the desired inlet temperatures. Cooling the blades can be accomplished by using some of the air normally supplied to the turbine by the compressor in its regular mode of operation. Additional pumping means may be required to force the air to the blades. Then the problem of sealing of the flow path and restricting the areas where the cooling fluid might leak arises. Bolt on sealing and locking devices help seal the rotor and to lock the blades, but bolt on devices are not very reliable, and they present a windage problem within the turbine.

The effectiveness of these arrangements, along with the costs, have been less than desirable.

SUMMARY OF THE INVENTION

The present invention provides a simple and efficient structure for supplying a flow of cooling fluid to the root portions of each blade while simultaneously providing a sealing and a locking means for sealing each coolant fluid flow path and locking each turbine blade to the rotor. The rotor disc has a radially directed groove on its upstream side. The groove acts as a pump to force cooling fluid into a plenum-chamber like cavity adjacent and beneath each blade root. An inlet rotor bell with a flexible band seal between the bell and the blade root restricts the flow of cooling fluid and keeps it from entering the hot fluid working area. Holes in the blade root allows the cooling fluid to pass through and cool the blade root and the blade. A plate on the downstream end of each cavity seals off the cavity and prevents fluid from leaking downstream past the cavity. The inner edge of the plate fits in a groove on the rotor disc periphery. The outer portion of the plate is notched and engages a tab in the downstream inner portion of the blade root to prevent the seal plate from sliding circumferentially within the groove.

An additional seal and locking plate is downstream of the blade root. The inner edge of the seal and lock plate fits in a groove in the rotor periphery and is restrained from radial motion because its outer edge is seated in another groove, in an extension of the blade platform. This seal and locking plate prevents the blades from any axial movement because the plate is locked in the groove in the rotor periphery, and it is also locked in the groove in the platform extension.

Each groove in the blade platform extension is provided with an indexing slot. Each seal and locking plate has an indexing tab. The tab is receivable in said slot for properly locating and orienting the seal and lock plates with their respective blades.

The last sealing and locking plate will be slightly smaller than adjacent plates, and may be provided with an inwardly facing beveled edge to permit the last seal and locking plate to be inserted between the blade and the rotor disc; the last plate is then locked in place by indexing lock screws and special lock washers.

DESCRIPTION OF THE PREFERRED EMBODIMENTS

Figure 1:
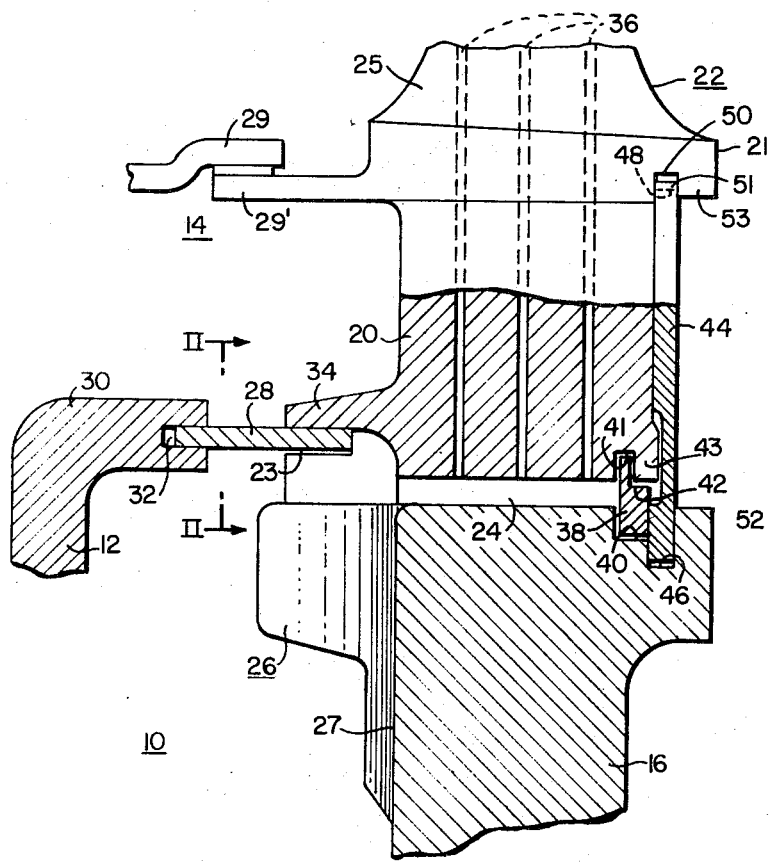
FIG. 1 is a side elevational view of a rotor disc and blade assembly constructed in accordance with the principle of this invention.
Figure 2:
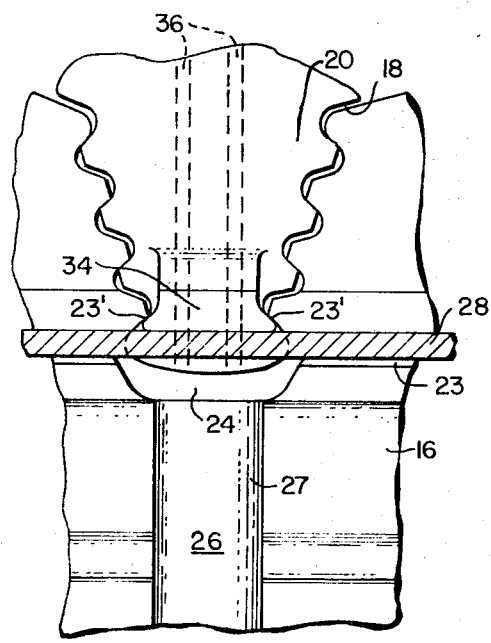
FIG. 2 is an end elevational view taken along lines II—II of FIG. 1.

Referring to the drawings in detail, and particulary to FIGS. 1 and 2, the structure shown therein comprises a portion of an axial flow gas turbine 10, including an inlet bell 12 and a rotor assembly 14. The rotor assembly 14 comprises a disc 16 having a periphery provided with axially extending serrated channels 18 for receiving serrated root portions 20 of cooled turbine blades 22. Each blade 22 has a root portion 20, an air foil portion 25, and a platform portion 21 therebetween.

The radially innermost portion of each channel 18 comprises a fluid flow plenum chamber 24 for passing a cooling fluid from a pump 26 to the blade root 20. The pump 26 comprises a generally radially directed groove 27, disposed on the upstream side of the disc 16, near its periphery, and adjacent each chamber 24. The pump 26 receives cooling fluid from a source (not shown) and brings it up to rim tangential velocity due to the centrifugal forces imparted to the cooling fluid by the rotating disc 16.

The cooling fluid is drawn from a source (not shown) upstream of the bell 12. The fluid is prevented from leaking radially outwardly of the area between the inlet bell 12 and the upstream sides of the blade root 20 by a flexible band 28. The inlet bell 12 has a circular lip 30 directed downstream in which an axially disposed circular groove 32 retains the upstream edge of the flexible band 28. The upstream portion of each blade root 20 has a projection 34 disposed radially outwardly of and adjacent the downstream edge of the flexible band 28. The disc 16 has a groove 23 which slidably receives the downstream edge of the band 28. The flexible band 28 crosses each channel 18 at a point of pressure 23' between the radially outwardly forced blade 20 and the serrations in the channel 18, providing maximum sealing between the band 28, the blade 22 and the disc 16. Each of the projections 34 on the blades 22 and the groove 23 on the disc 16 slide over the band 28 during rotor disc 16 rotation sealing the cooling fluid, rataining the cooling fluid between the inlet bell 12 and the upstream portion of blade 20 in disc 16 until the fluid is pumped into the chamber 24 and through the blade 22. This is shown in FIGS. 1 and 2. An inlet seal 29 and a projection 29' on the upstream side of each platform 21 slide over one another and prevent hot motive fluid from entering and contaminating the blade root area.

Figure 5:
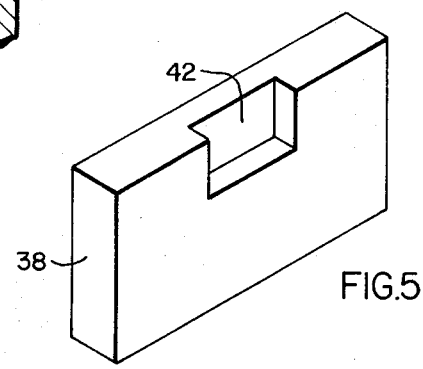
FIG. 5 is a perspective view of a chamber sealing plate.
Figure 4:
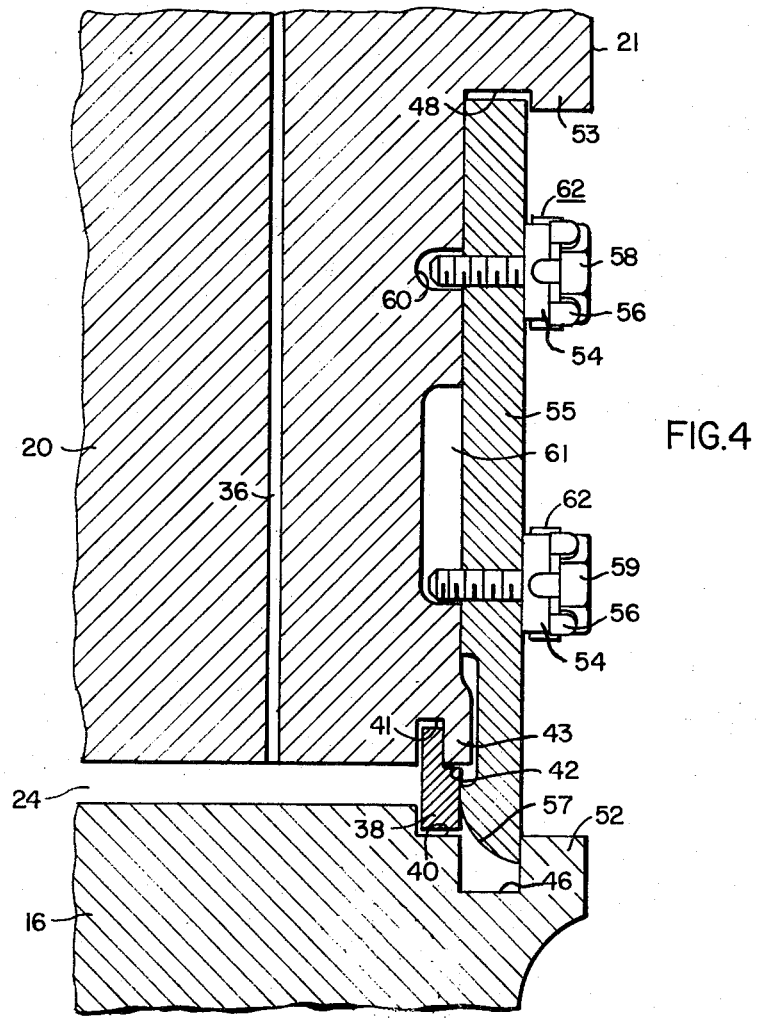
FIG. 4 is a side sectional view of a plate taken along lines IV—IV of FIG. 3.

The fluid flow plenum chamber 24 is a passageway for the cooling fluid, allowing the cooling fluid to enter the roots 20 of the cooled blades 22. The fluid passes through a plurality of radially directed holes 36, cooling the blade 22 and exiting out the airfoil portion 25 of each blade 22. The downstream end of each chamber 24 is sealed by a plenum seal plate 38 as shown in FIGS. 1, 4 and 5. The radially inner edge of plate 38 is disposed in a circumferential radially outwardly extending peripheral groove 40 near the downstream side of the rotor disc 16. The radially outer edge of plate 38 is disposed in a groove 41 in the downstream radially inner portion or root 20. Each plate 38 also has a notch 42 that engages a lock tab 43 within groove 41 on the downstream radially inward end of each blade root 20. The notch 42 and tab 43 interlock and prevent the plate 38 from sliding circumferentially in the groove 40 during rotor disc 16 rotation. The plenum seal plate 38 is forced by centrifugal forces during rotor disc 16 rotation, into the groove 41 in the downstream inward portion of the blade root 20. The momentum of the plate 38 helps maintain the plenum sealing configuration.

A plurality of exhaust sealing and locking plates 44 are held on their radially inward edge by another circumferential radially outwardly extending peripheral groove 46 downstream of and adjacent the groove 40. The sealing and locking plates 44 are retained at their radially outward edge by a radially inwardly facing groove 48 off the downstream side of each blade platform 21. When the blades 22 are inserted in the channels 18, the groove 48 is located radially outwardly of the circular peripherally disposed groove 46 provided in the disc 16.

Figure 3:
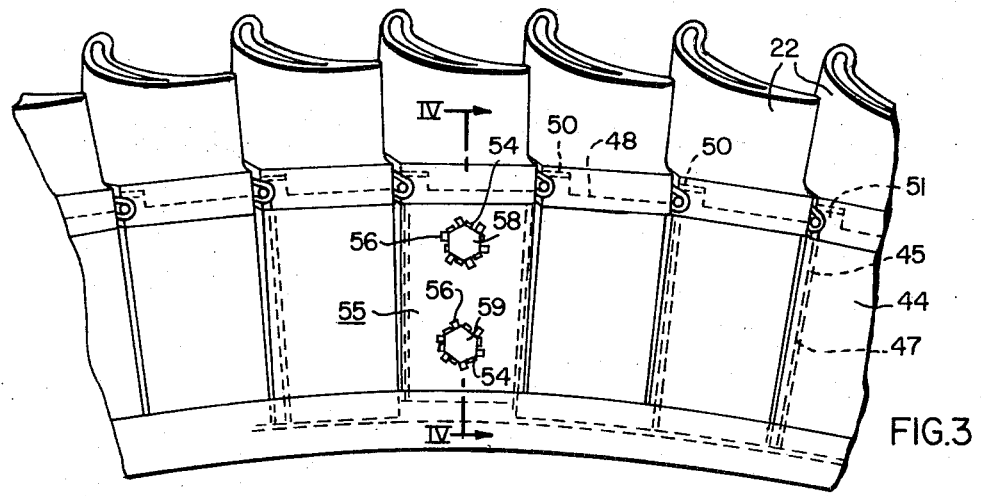
FIG. 3 is a partial side elevational view of the downstream side of a turbine rotor showing side plates secured thereto in accordance with the invention.

The grooves 48 in the blade platforms 21 are further provided with an indexing slot 50 as shown in FIG. 3.

Figure 6:
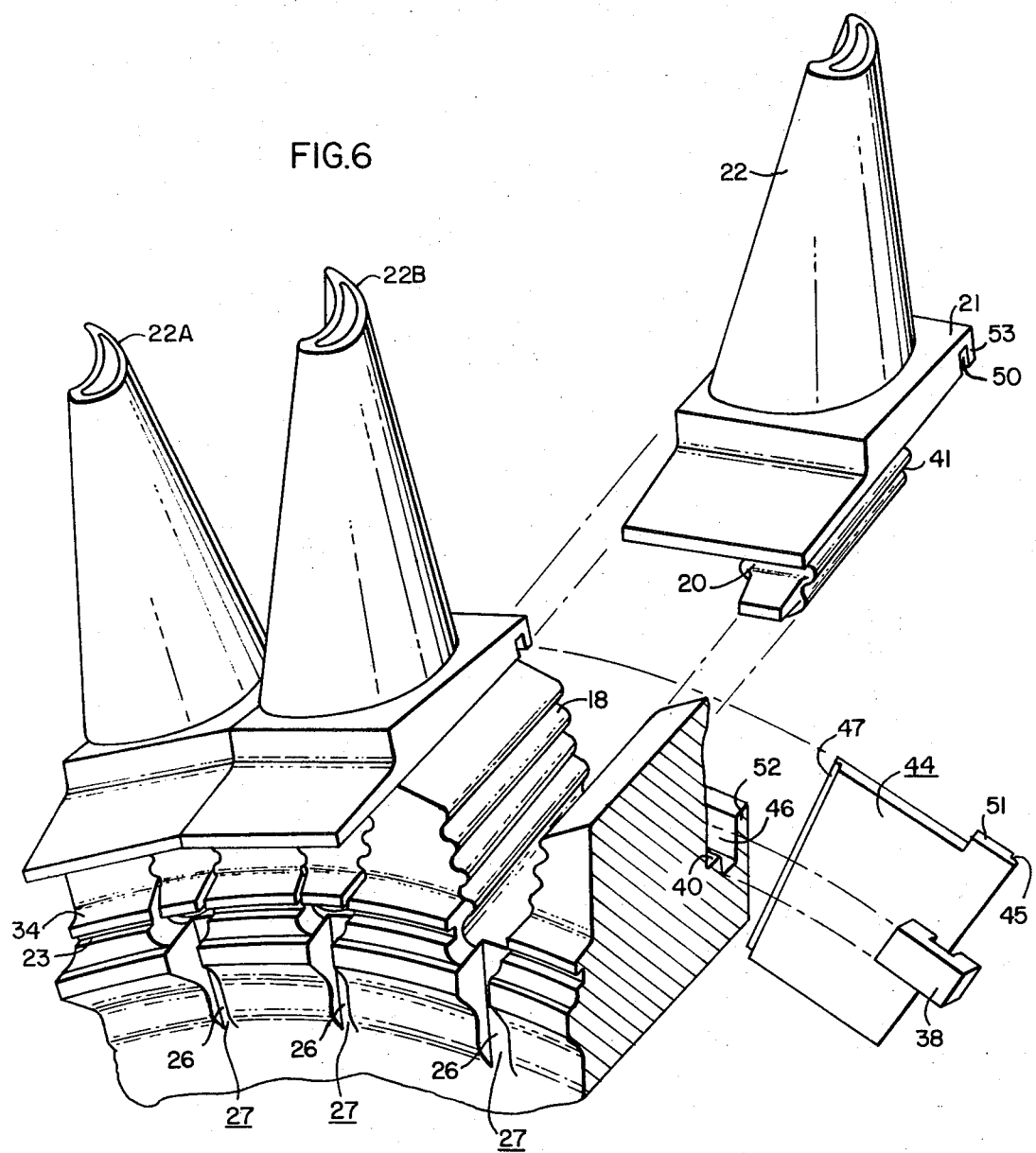
FIG. 6 is a perspective view of turbine rotor blades and a portion of a rotor disc showing the rotor disc, cooling fluid pump, blade root, and side plate structures of this invention.

As shown in FIGS. 3 and 6, the plates 44 are provided with lip or shoulder portions 45 and 47 facing in opposite directions, on two opposed edges thereof respectively, and a tab portion 51 extending in an outwardly radial direction from an outer corner from each plate 44.

The blades 22 and the plates 38 and 44 are assembled in the following manner: one of the blades, for example, blade 22A, is first axially inserted into its associated channel 18, as shown in FIG. 6. When the root 20 of the blade 22A is almost axially centered in the channel 18, a plenum seal plate 38 is inserted into the peripheral groove 40 near the downstream side of disc 16. The plenum seal plate 38 is then fitted into its respective groove 41 in the radially inward portion of blade root 20, and engages the notch 42 of plate 38 with tab 43 in the groove 41. The blade 22A is then completely inserted axially into its channel 18. The exhaust sealing and locking plate 44 is disposed between the inserted blade 22 and the disc 16 by inserting the plate into the grooves 46 and 48, in a circumferential direction towards the blade 22A, or from right to left as shown in FIG. 6. Each plate 44 is moved into the grooves 46 and 48 until its tab 51 enters the slot 50, and more particularly until the tab 51 engages the ledge provided by the slot 50. Thus, the slot 50 and the tab 51 form an indexing means for properly orienting each plate 44 with its associated blade 22.

Each inserted exhaust sealing and locking plate 44 will contact the downstream side of its respective plenum seal plate 38 and prevent it from being displaced axially.

After the first blade 22A is inserted into its associated channel 18 of the disc 16, and after the upstream extension 34 of each blade root 20 is disposed radially outwardly of the downstream portion of the flexible band 28, and the associated plenum and locking plates 38 and 44 are properly inserted in the grooves 40, 41, 46 and 48, another blade 22B is inserted in the next adjacent channel 18 and the plenum plate 38 and sealing and locking plates 44 are inserted in the manner described. This process is continued until all but the last of the locking and sealing plates is ready to be disposed in the periphery of the disc 16. The last plate is to be inserted in a manner different from that described above for reasons to be explained hereinafter.

As successive plates, plenum plates 38 and their respective locking and exhaust sealing plates 44, are disposed in their respective grooves 40, 41, 46 and 48, the lip portion 45 and 47 of adjacent plates engage each other in an overlapping relationship which causes the interlocking together of the adjacent plates. Further, the plenum plates 38 are prevented from moving circumferentially in the grooves 40 and 41 by tab 43 extending into the notch 42 in plate 38. The blade locking and exhaust sealing blades 44 prevent axial motion of the plenum plates 38. The plates 44 themselves are prevented from circumferential motion in their grooves 46 and 48 by tab 51 extending into the slot 50 of each respective blade 22 as shown in FIG. 3.

The grooves 46 and 48 provide radially extending ledges 52 and 53 respectively, which hold the plates 44 in place at each end so that the blades 22 cannot be displaced axially from the periphery of the disc 16. The intermeshing serrations provided in the channels 18 prevent the blades 22 from radial displacement with the rotation of the rotor assembly 14. When all the plates 44, including a last plate 55, are assembled between the disc 16 and the blades 22, the plates 44 and the last plate 55 form a continuous circular wall, all plates 44 and plate 55 restraining their respective plenum seal plates 38.

When all but the last of the exhaust sealing and locking plates 44 are disposed between grooves 46 and 48, the last plenum plate 38 already being inserted in the axially centered blade 22, the clearances are insufficient for inserting a plate 44 of the type described above. For this reason, the last plate 55 is of a slightly different construction. Such a construction is shown in FIGS. 3 and 4. The plate 55 is shown in FIG. 4, which is the last plate to retain the last inserted plenum seal plate 38, which completes the assembly process.

In order to insert the last seal and locking plate 55, the plate 55 must be provided with a chamfered or beveled edge 57 on one face thereof, in order that it may pass the ledge 52. This allows the beveled portion 57 to be first inserted into the groove 46, as shown in FIG. 4, so that the top of the plate 55 can clear ledge 53 of the blade platform 21 as the plate is thrust toward the downstream face of blade root 20. After the plate 55 is located between groove 46 and 48, it is raised into the groove 48. The radially inward portion of plate 55 provides contact with the plenum plate 38, preventing axial dislocation of the plate 38. The last locking plate 55 is then secured in this position by lock screws or bolts 58 and 59, shown threaded into the plate 55 and disposed within recesses 60 and 61, respectively, provided in the downstream face of the blade root 20. Lockscrew 58 acts as an indexing tab and lockscrew 59 supports the plate 55.

The recess 60 and lockscrew 58 serve as indexing means for properly locating the plate 55 with its respective blade 22. Thus, the plate 55 is not provided with an indexing tab 51, as are the other locking and sealing plates 44. Both indexing features, however, permit independent tangential expansion of the plates without the plates becoming bunched or separated. The notched plenum seal plates 38 are all identical, whether they are used with exhaust seal plates 44 or the last plate 55. In this manner, uncontrolled leakage of cooling fluid is prevented. During rotation of the rotor 16, centrifugal forces move the plenum seal plates 38 and the exhaust sealing and locking plates 44 and 55 into the grooves 41 and 48 and against the blade platform 21.

Figure 7:
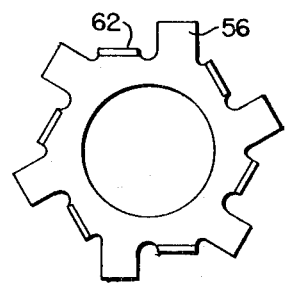
FIG. 7 is a special type of lock washer.

Before the lockscrews 58 and 59 are disposed in the plates 55, a suitable lock washer 62 which is shown in FIG. 7, is disposed between the head of each lockscrew 58 and 59 and an extension 54 of the plates 55, to secure the lockscrews in place. Tabs 56 on the lock washers 62 are rotated against the extension 54 of plate 55. This procedure insures the security of the plate 55, which in turn secures the plenum seal plates 38, and the remaining exhaust sealing and locking plates 44. The lockscrew 59 provides the support function for the plate 55.

In operation, a cooling fluid, from an associated air compressor operating within the turbine, for example, is drawn through the area between inlet bell 12 and rotor 16 and pumped by radially directed groove 26 to a tangential velocity. The fluid is sealed from the hot gaseous fluid flow path and blade channel 18 by a flexible circumferentially disposed seal 28, retained on its upstream edge by an axially aligned circumferential groove 32 in the bell 12. The downstream edge of the flexible seal 28 is restrained radially by an extension 34 disposed on the upstream side and the radially inner portion of blade root 20, and by an intermittent groove 23 slidably disposed over the band 28.

The cooling fluid is forced into the axially directed plenum chamber 24 by the pumping action of radially directed groove 26, the cooling fluid thereafter passing from the chamber through cooling passageways 36 and radially outward through the air foil 25 of blade 22.

The engagement of the plates 44 and 55 with the groove 46 in the disc 16 and the groove 48 in each blade extension 21 lock the plenum plates 38 and the blade roots 20 axially with respect to the disc 16. The plates 44 and 55 also help prevent leakage of cooling fluid beyond the downstream end of chamber 24 or blade root 20.

Though the invention has been described with a certain degree of particularity, changes may be made therein without departing from the spirit and scope thereof. For example, the invention has been described using only one rotor disc. Obviously, a plurality of such discs may be employed using the principles of the invention without departing from the scope of the invention. Similarly, the roots of the blades and the side entry disc channels may have other forms than the serrated form above. The radial pump and passageways may be formed in a manner different from that shown in the figures for cooling the blade root.

What we claim is:

1. A rotor assembly for an axial flow gas turbine comprising: a plurality of rotor blades, each blade having an airfoil portion, a root portion, and a platform therebetween, at least one rotatable turbine rotor or disc having a plurality of side entry channels spaced on the periphery thereof for receiving the root portions of blades, a chamber axially disposed radially inwardly of and adjacent the root portions of the blades, a plurality of radially directed cooling fluid flow passageways extending from the root portion through the airfoil portion of the blade, said passageways being in fluid communication with said axially disposed chamber, a generally radially directed groove disposed on the upstream side of the rotor, said groove being in fluid communication with said axially disposed chamber, said groove comprising a pumping means during rotor rotation to draw cooling fluid from a source, forcing said fluid through said axially disposed chamber and into said radially directed passageways, said fluid being discharged from the radially outermost end of said passageways in the airfoil portions of the blade, plate means for sealing the chamber downstream, said plate means being notched to interlock with a mating tab on the downstream end of the blade root, said plate means being disposed in a peripheral groove near the downstream side of said disc, exhaust sealing and locking plate means disposed on the downstream side of the blade root, said exhaust sealing and locking plate means being supported inwardly by a peripheral groove on the downstream edge of the disc and supported outwardly by an inwardly facing groove in an extension of the blade platform, said sealing and locking plate means being in restraining contact with said chamber sealing plate means, said locking plate means preventing axial movement of said blade and said chamber sealing plate means, said exhaust sealing and locking plate means sealing the downstream portion of said side entry channels.

2. The structure as recited in claim 1, wherein said groove is disposed only on the radially outward portion of the upstream surface of said disc.

3. The structure as recited in claim 1, wherein at least one of said exhaust plates is fixedly attachable to the downstream side of its adjacent blade root.

4. The structure as recited in claim 1, including an inlet rotor bell having an axially directed circumferential slot, a flexible band slidably disposed in said circumferential slot, an extension on the upstream radially inward portion of the blade root, and an intermittent groove on the upstream surface of the disc near its periphery, said blade root extension and said intermittent groove being slidably disposed over the flexible band, said band providing a seal between the inlet bell and the blades mounted in said rotating disc.

5. The structure as recited in claim 1, wherein said fixedly attachable plate is beveled on its radially inward upstream edge to permit access to the radially inward support groove in the disc periphery.

* * * * *